United States Patent
Bhave et al.

(10) Patent No.: US 9,528,829 B2
(45) Date of Patent: Dec. 27, 2016

(54) GYROSCOPES BASED ON OPTOMECHANICAL SENSING

(75) Inventors: Sunil Bhave, Ithaca, NY (US); Renyuan Wang, Ithaca, NY (US)

(73) Assignee: CORNELL UNIVERSITY, Ithaca, NY (US)

( * ) Notice: Subject to any disclaimer, the term of this patent is extended or adjusted under 35 U.S.C. 154(b) by 410 days.

(21) Appl. No.: 14/232,880

(22) PCT Filed: Jul. 16, 2012

(86) PCT No.: PCT/US2012/046961
§ 371 (c)(1),
(2), (4) Date: May 28, 2014

(87) PCT Pub. No.: WO2013/010182
PCT Pub. Date: Jan. 17, 2013

(65) Prior Publication Data
US 2014/0260614 A1     Sep. 18, 2014

Related U.S. Application Data

(60) Provisional application No. 61/507,705, filed on Jul. 14, 2011.

(51) Int. Cl.
| | | |
|---|---|---|
| *G01C 19/56* | (2012.01) | |
| *G01C 19/04* | (2006.01) | |
| *G01C 19/5677* | (2012.01) | |
| *G01C 19/5726* | (2012.01) | |

(52) U.S. Cl.
CPC .......... *G01C 19/04* (2013.01); *G01C 19/5677* (2013.01); *G01C 19/5726* (2013.01)

(58) Field of Classification Search
CPC ... G01C 19/56; G01C 19/5677; G01C 19/572; G01C 19/04; G01C 19/64; G01C 19/66; G01C 19/72; G01C 19/7236; G01C 19/5684; G01C 19/5712; G01C 19/5776
USPC ........................ 73/504.01, 504.12, 504.14, 504.02, 73/504.04, 514.26; 356/460, 470, 480
See application file for complete search history.

(56) References Cited

U.S. PATENT DOCUMENTS

| | | | | |
|---|---|---|---|---|
| 4,039,260 A | * | 8/1977 | Redman ................. | G01C 19/66 356/461 |
| 4,315,693 A | * | 2/1982 | Walker ................... | G01C 21/16 356/470 |
| 4,422,331 A | * | 12/1983 | Walker ................... | G01P 15/093 73/514.27 |
| 4,429,573 A | * | 2/1984 | Walker ................. | G01C 19/727 356/461 |
| 4,454,418 A | * | 6/1984 | Walker ............... | G01D 5/35303 250/227.14 |
| 4,635,482 A | * | 1/1987 | Walker ................. | G01P 15/093 356/483 |

(Continued)

FOREIGN PATENT DOCUMENTS

WO     2010051560 A1     5/2010

OTHER PUBLICATIONS

Kippenberg, T.J., et al., "Cavity Opto-Mechanics," Optics Express, vol. 15 (25): 17172-17205, Dec. 10, 2007.

*Primary Examiner* — Helen Kwok
(74) *Attorney, Agent, or Firm* — Perkins Coie LLP (57) ABSTRACT

Gyroscopes based on optomechanical designs to provide sensitive sensing while providing relatively large bandwidth and dynamic range with enhanced noise performance.

20 Claims, 8 Drawing Sheets

(56) References Cited

U.S. PATENT DOCUMENTS

| | | | | |
|---|---|---|---|---|
| 4,830,495 | A * | 5/1989 | SooHoo | G01C 19/727 356/470 |
| 5,262,843 | A * | 11/1993 | Sugarbaker | G01C 19/72 356/464 |
| 5,331,403 | A | 7/1994 | Rosker et al. | |
| 6,546,798 | B1 * | 4/2003 | Waters | G01C 19/56 356/460 |
| 7,159,461 | B2 | 1/2007 | Gallon et al. | |
| 8,514,400 | B2 * | 8/2013 | Mohageg | G01C 19/72 356/459 |
| 2006/0164648 | A1 | 7/2006 | Howard | |
| 2010/0309474 | A1 * | 12/2010 | Kilic | G01C 19/5712 356/460 |
| 2014/0283601 | A1 * | 9/2014 | Bhave | G01P 15/093 73/504.12 |
| 2015/0168441 | A1 * | 6/2015 | Hutchison | G01P 15/093 356/460 |
| 2015/0168442 | A1 * | 6/2015 | Hutchison | G01B 9/02023 356/477 |
| 2016/0069686 | A1 * | 3/2016 | Lee | G01C 19/661 356/460 |

\* cited by examiner

GYROSCOPES BASED ON OPTOMECHANICAL SENSING

PRIORITY CLAIM AND RELATED PATENT APPLICATIONS

This patent document is a 35 USC §371 National Stage application of International Application No. PCT/US2012/046961 filed Jul. 16, 2012, which claims the benefit of U.S. Provisional Application No. 61/507,705 entitled "GYROSCOPE APPARATUS, METHODS, AND APPLICATIONS" and filed Jul. 14, 2011, the disclosures of which are incorporated by reference as part of the specification of this document.

BACKGROUND

This patent document relates to gyroscope devices.

Gyroscopes can be constructed from micromachined parts, such as microelectromechanical systems (MEMS), on silicon and other substrates to use a vibrating mass or proof mass to sense rotation. MEMS gyroscopes can be widely used in various devices, including mobile computing devices or mobile communication devices. Some application examples of MEMS gyroscopes are vehicle stability control, GPS assist, vehicle roll-over protection, game console controllers, camcorder stabilization and smartphones.

SUMMARY

This patent document provides optomechanical techniques and gyroscopes designs.

In one aspect, a method is provided for operating a gyroscope to measure a rotation. This method includes coupling a vibrating mass to both a driving oscillator that oscillates along a driving axis and a sensing oscillates long a sensing axis which different from the driving axis, wherein the sensing oscillator includes a sensing optical resonator coupled to the vibrating mass to respond to motion of the vibrating mass along the sensing axis to change an optical resonance of the sensing optical resonator. This method further includes operating the driving oscillator to drive the vibrating mass to oscillate along the driving axis; operating the sensing oscillator coupled to the vibrating mass to receive energy coupled from the driving oscillator due to rotation of the gyroscope to cause the vibrating mass to oscillate along the sensing axis and to modulate the optical resonance of the sensing optical resonator; coupling laser light at a laser frequency that is detuned from and is less than the optical resonance of the sensing optical resonator into the sensing optical resonator to cause a transfer of energy from the vibrating mass to the sensing optical resonator; and measuring modulated light coupled out of the sensing optical resonator indicating a motion of the vibrating mass along the sensing axis to obtain rotation information of the gyroscope.

This and other aspects, their implementations are described in greater detail in the drawings, the description and the claims.

DETAILED DESCRIPTION

The gyroscopes described in this document are vibratory rate gyroscopes that use a vibrating mass and measure the rotation rate by measurements of the vibrating mass based on the Coriolis Effect via optomechanical sensing. The vibrating mass is free to move in two different mechanical modes, e.g., two orthogonal mechanical modes, in one of the modes (known as drive mode) the vibrating mass is driven into oscillation by an oscillatory driving force, e.g., an electrostatic force, electromagnetic force, piezoelectric force, or optomechanical force. When the gyroscope device is undergone rotation, the oscillating motion of in the driving mode is coupled into the orthogonal mode (or sense mode), where the coupling strength is proportional to the rotation rate. Therefore, the rotation rate can be determined by measuring the motion in the sense mode. A sensing optical resonator is provided in the gyroscopes described in this document to use an optomechanical coupling for the sensing operation. The optomechanical sensing described in this document can be implemented in various gyroscope configurations, including MEMS gyroscopes, in ways that achieve improved resolution and sensitivity in rotation rate measurements.

In general, to improve the resolution and sensitivity, it is desirable to use a high quality factor Q sense mode, as the response in the sense mode is amplified by the mode quality factor Q. In addition, the fundamental noise floor can be reduced due to the use of the high Q sense mode because the thermal noise associated with the mode is inversely proportional to the quality factor Q. However, in various implementations of such a high-Q sense mode, certain the tradeoffs may exist, including, e.g., reduced bandwidth, limited dynamic range and increased difficulties for matching the frequencies of the sense mode and the drive mode to cancel the quadrature error. A close-loop design using electrostatic force feedback may be used to mitigate the bandwidth and dynamic range problems. However, each stage of the electronic circuits may add additional noise to the system. Meanwhile, the loop delay may also limit the upper bound of the driving frequency. This condition imposes an upper-bound on the sensitivity since the Coriolis acceleration is proportional to the oscillation frequency in the driving mode.

The optomechanical sensing described in this document can be implemented in gyroscopes to relieve above constraints utilizing the effect of laser dynamic-back-action upon a high Q mechanical resonator. The effect of laser dynamic-back action arises when light is confined in a high finesse optical cavity or resonator that is coupled to motion of the vibrating mass in the sense mode. In an example of an optical Fabry-Perot resonator, one of the two mirrors of the optical resonator can be a spring-loaded mirror which forms a mechanical resonator. Depending on the frequency of the confined light with respect to the cavity resonant frequency, the radiation pressure of the light can exert either a viscous force or an anti-viscous force on the mirror. When the light is red-detuned relative to an optical resonance of the resonator, the radiation pressure gives rise to a dynamic retardation force. This force broadens the bandwidth of the mechanical resonator (A.K.A. cooling, as it reduces the effective temperature of the mechanical mode) without adding extraneous noise. On the other hand, when the light is blue-detuned relative to the optical resonance, the anti-viscous radiation force can drive the mechanical mode into parametric oscillation (heating). By attaching the sense mode of a mode-matched high-Q rate gyro to the cavity mirror in the example of a Fabry-Perot optical resonator, the radiation pressure in the optical resonator can be used to increase the bandwidth and dynamic range of the sense mode without deteriorating the noise performance. In addition, the mechanical resonant frequency is dictated by and limited by the cavity round trip time and thus can be set in a wide range of values. Therefore, the present optomechanical sensing scheme can simultaneously achieve high sensitivity, high resolution offered by the high Q sense mode, while maintain large bandwidth and high dynamic range. In some implementations, the present optomechanical sensing scheme can be implemented in ways that are inherently compatible with optical interferometry measurement which can enable atto-meter level displacement detection in the sense mode.

Figure 1:
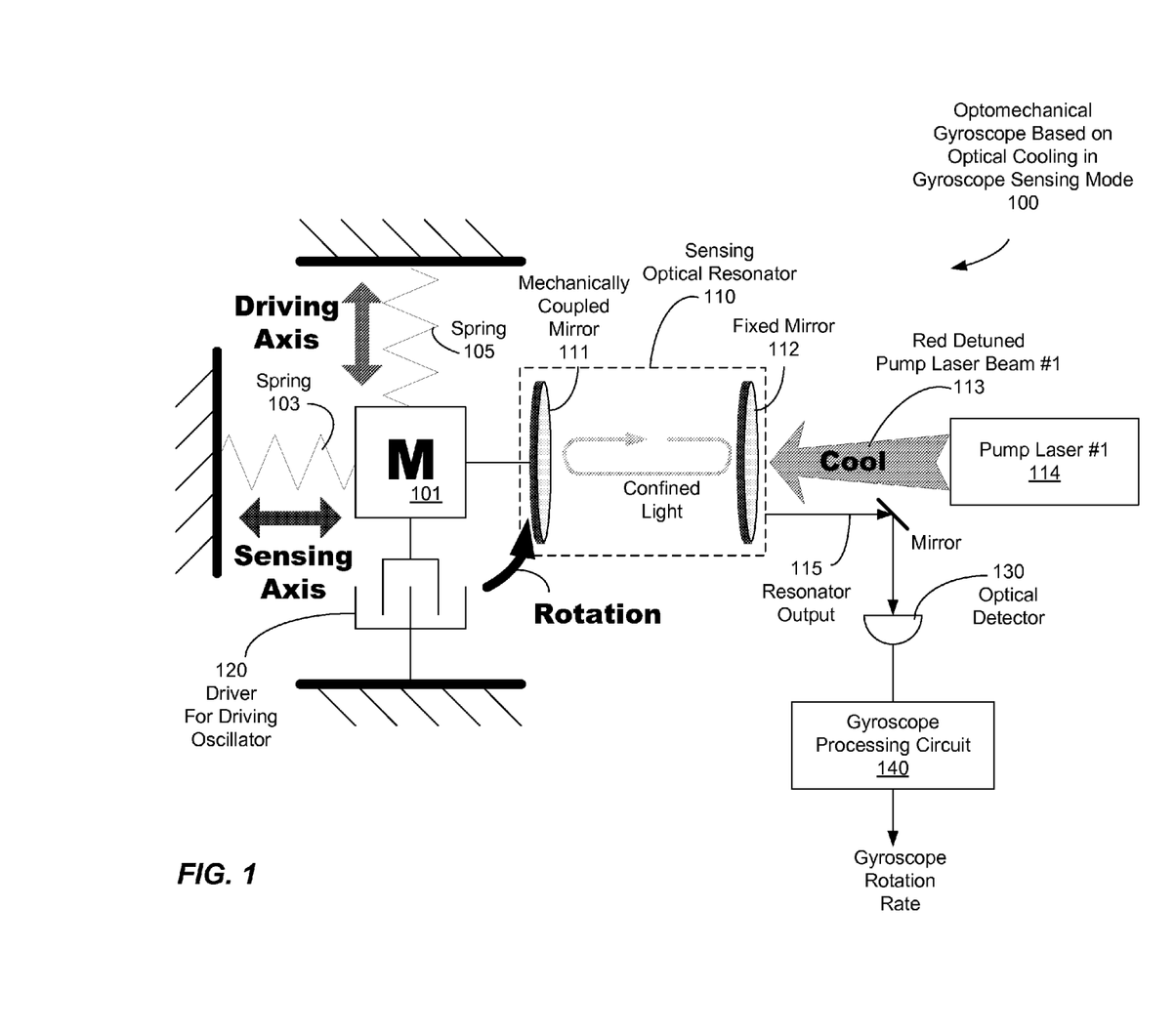
FIG. 1 shows an example of a gyroscope based on optomechanical sensing.

FIG. 1 shows an example of a gyroscope based on optomechanical sensing. In this example, the gyroscope 100 includes a vibrating mass 101, a driving oscillator coupled to the vibrating mass 101 to drive the vibrating mass via a driver 120 to oscillate along a driving axis, and a sensing oscillator coupled to the vibrating mass 101 to allow the vibrating mass 101 to oscillate along a sensing axis that is different from the driving axis. In general, the driving oscillator and the sensing oscillator are configured to operate in different mechanical modes. The vibrating mass 101 can be effectuated by using an object that is separate from the sensing optical resonator 110 in some implementations and can also be part of the sensing optical resonator 110 in other implementations. Notably, a sensing optical resonator 110 is provided as part of the sensing oscillator to provide the optomechanical sensing. Hence, the sensing oscillator exhibits a mechanical mode and an optical mode. In this example, the driving oscillator includes a spring 105 along the driving axis that is attached to the vibrating mass 101 on one side and a driver 120 attached to the vibrating mass 101 on the other side. The drive 120 in this example is an electrostatic driver and can also be implemented by other driving mechanisms such as electromagnetic, piezoelectric, or optomechanical mechanisms. The sensing oscillator includes a sensing mechanical oscillator having a spring 103 attached to the vibrating mass 101 and a mechanical coupling between the vibrating mass 101 and the sensing optical resonator 110. The sensing oscillator is mechanically coupled to the driving oscillator via the vibrating mass 101 and receives energy from the driving oscillator due to rotation-induced coupling between the driving and sensing oscillators via the Coriolis Effect. This rotation-induced coupling causes the vibrating mass 101 to oscillate along the sensing axis. This oscillation along the sensing axis, in turn, causes the sensing optical resonator 110, which is coupled to the vibrating mass 101, to respond to modulate an optical resonance of the sensing optical resonator 110.

The sensing optical resonator 110 in the example in FIG. 1 is an optical Fabry-Perot resonator that has two cavity mirrors 111 and 112 spaced from each other with a desired resonator length to produce a desired free spectral range (FSR) and optical resonances. The mirror 111 is mechanically coupled to the vibrating mass 101 as part of the sensing oscillator and moves with the vibrating mass 101. Since the other mirror 112 is fixed in position relative to the mirror 111, this movement of the mirror 111 changes the cavity length of the sensing optical resonator 110 and thus changes the optical resonances. The oscillation of the vibrating mass 101 along the sensing axis causes an optical resonance of the resonator 110 to be modulated. In other implementations, the sensing optical resonator 110 can be in other resonator configurations, e.g., a ring resonator with a closed optical loop which is mechanically coupled to the vibrating mass 101 to change the optical resonance, or an optical disk resonator. The light confined inside the sensing optical resonator 110 is thus modulated. This modulated light can be measured to indicate the motion of the vibrating mass 101 along the sensing axis to obtain rotation information of the gyroscope 100. In FIG. 1, the light inside the sensing optical resonator 110 is coupled out of the resonator 110 as the resonator output 115 and is directed to an optical detector 130 and the detector output of the detector 130 is processed by a gyroscope processing circuit 140 to produce the information on the rotation rate of the gyroscope 100.

Notably, a laser 114 is provided as the pump laser for pumping the sensing optical resonator 110. The laser 114 produces laser light at a laser frequency that is detuned from and is less than an optical resonance of the sensing optical resonator 110 to cause a transfer of energy from the sensing mechanical oscillator to the sensing optical resonator 110. As explained in detail below, this transfer of energy causes the bandwidth of the sensing mode to increase and also an increase in the dynamic range of the sense mode without deteriorating the noise performance. This detuning condition between the laser 114 and the optical resonance is maintained during the operation of the gyroscope 110.

Laser dynamic-back-action in FIG. 1 and other examples in this document can be understood in terms of Doppler cooling. When light is confined in a high finesse optical cavity with the spring-loaded end mirror 111 in the example in FIG. 1, the mechanical mode of vibration of the end mirror 111 modulates the confined light and generates stoke and anti-stoke peaks. The strength of the peaks is modified by the cavity linewidth function. Therefore, when the confined light is detuned from the optical resonance of the resonator, the asymmetry between stoke and anti-stoke peaks give rise to a net power flow between the mechanical mode of vibration and optical modes.

Figure 2:
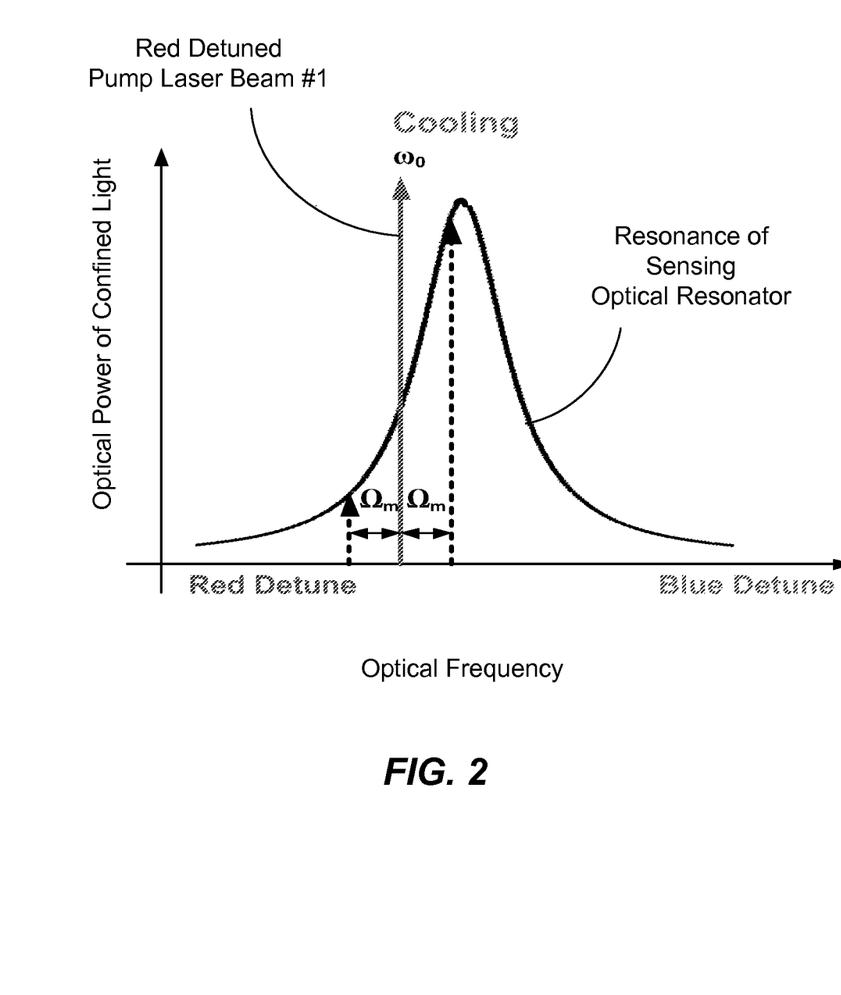
FIG. 2 shows the desired frequency detuning condition for the sensing optical resonator 110 in FIG. 1.

FIG. 2 shows the desired frequency detuning condition for the sensing optical resonator 110 in FIG. 1. Notably, the laser light for pumping the sensing optical resonator 110 is red-detuned from an optical resonance peak. Under this detuning between the laser 114 and the resonator 110, the anti-stoke peak is larger than the stoke peak. Therefore, the energy flows from the mechanical domain to the optical domain (A.K.A cooling, as the radiation pressure suck out energy from the mechanical mode). On the other hand, if the light is blue-detuned, the stoke peak is larger than the anti-stoke peak and the mechanical mode gains energy from the optical domain (heating). Therefore, the sensing resonator 110 and the laser 114 are maintained at the red-detuned condition to achieve the desired optomechanical sensing.

The effect of laser dynamic-back-action in such optomechanical systems can be modeled using the following set of equations.

$$\frac{da}{dt} = -i\Delta(x)a - \left(\frac{1}{2\tau_0} + \frac{1}{2\tau_{ex}}\right)a + i\sqrt{\frac{1}{\tau_{ex}}} s$$

$$\frac{d^2x}{dt^2} + \frac{\Omega_m}{2Q_m}\frac{dx}{dt} + \Omega_m^2 x = \frac{\xi}{cm_{eff}}\frac{|a|^2}{T_{rt}} + \frac{F_{langevin}(t)}{m_{eff}}$$

where some of the variables are defined in the following table. The top equation governs the behavior of the optical cavity, and the bottom equation models the mechanical resonator.

| Variable Name | Definition |
|---|---|
| $|a|^2$ | Circulating energy inside the optical cavity |
| $|s|^2$ | Power of the pump laser |
| $\tau_0$ | Intrinsic cavity decay time |
| $\tau_{ex}$ | Extrinsic cavity decay time |
| $\Delta(x) = \Delta + \frac{\omega_0}{R}x$ | Angular frequency difference between the pump laser and optical cavity resonant frequency |
| $\Delta$ | Frequency detuning of the pump laser |
| $\omega_0$ | Optical cavity resonant frequency |
| R | Optical cavity round trip length |
| $Q_m$ | Quality factor of the mechanical resonator |
| c | Speed of light in vacuum |
| $T_{rt}$ | Cavity round trip time |
| $\xi$ | A constant depends on the optical cavity type |

One particular term of interest is the first term on the right-hand-side of the mechanical mode equation, which is the effective acceleration caused by the radiation force of the pump laser. The effective mass describes the coupling strength between the optical mode and a particular mechanical mode and can be determined using the following equation, $$m_{eff} = \frac{\langle V(r)^2, U(r)\rangle}{M}$$

$$M = \rho \int_V d^3 r |U(r)|^2$$

where M is the effective mass of the mechanical mode of vibration, V(r) and U(r) are the mode shape function of the optical mode and the mechanical mode respectively. In addition, the last term in the second equation is the random acceleration caused by the thermal bath, of which the power spectral density is related to the ambient temperature and the quality factor of the mode by the following equation, $$S_{Langevin} = \frac{\Omega_m}{Q_m} k_B T$$

Based on the above equations, the equilibrium position of the mirror $\bar{x}$ is shifted by the laser force and can be solved at steady state as shown below, $$\frac{\tau^2}{\tau_{ex}}|s|^2 = \frac{cm_{eff}}{\xi}\Omega_m^2 \bar{x}\left[4\tau^2\left(\Delta + \frac{\omega_0}{R}\bar{x}\right)^2 + 1\right]$$

The above equation shows that the mirror exhibit bistability induced by the radiation pressure.

The optical power circulating inside the optical cavity can be expressed in the following form by treating x as perturbation, $$P_{cav} = P_{cav}^0 + \alpha x - \Gamma \frac{dx}{dt}$$

The cavity circulating power is proportional to the radiation pressure. $P_{cav}^0$ gives rise to the mirror bistability as stated above. On the other hand, $\alpha x$ resembles Hook's law, and contributes to a mechanical resonant frequency shift (A.K.A. the laser induced stiffness effect), which can be derived as, $$\Delta\Omega_m = \mathcal{F}^2 \frac{8n^2\omega_0}{\Omega_m m_{eff} c^2} C\tau \cdot \left(\frac{\Delta - \Omega_m}{4(\Delta + \Omega_m)^2\tau^2 + 1} + \frac{\Delta + \Omega_m}{4(\Delta + \Omega_m)^2\tau^2 + 1}\right) \cdot |s|$$

In the above equation, the $$\Gamma \frac{dx}{dt}$$

term can either contribute to viscous damping or parametric driving depending on the sign of $\Gamma$, which is the damping rate (or heating rate) caused by the pump laser. When the pump light is red-detuned, the damping rate can be written as $$\Gamma = -\mathcal{F}^2 \frac{8n^2\omega_0}{\Omega_m m_{eff} c^2} C \cdot \left(\frac{1}{4(\Delta + \Omega_m)^2\tau^2 + 1} - \frac{1}{4(\Delta + \Omega_m)^2\tau^2 + 1}\right) \cdot |s|$$

$$C = \frac{\tau/\tau_{ex}}{4\Delta^2\tau^2 + 1}$$

$$\mathcal{F} = 2\pi\frac{\tau}{T_{rt}}$$

As a result, the effective damping rate of the mechanical mode is $$\Gamma_{eff} = \Gamma_m + \Gamma,$$

Accordingly, the effective temperature of the spring mass system is $$T_{eff} = \frac{\Gamma_m}{\Gamma_m + \Gamma} T_R$$

where $T_R$ is the actual temperature of the thermal bath. Therefore, the effective temperature of the gyro high Q sense mode can be reduced by applying laser cooling which equivalently broaden the linewidth. Such cooling mechanism doesn't affect the signal-to-noise ratio (SNR) of the high Q sense mode. This cooling mechanism avoids the problem introduced by electrostatic feedback in other gyroscope designs.

Referring to FIG. 1, the gyroscope 100 is a vibratory gyroscope that uses the Coriolis effect to detect rotation rate. The Coriolis acceleration of a linearly vibrating mass 101 can be written as, $$a_{Coriolis} = 2\Omega \times V_r$$

where $\Omega$ is the rotation rate, and $V_r$ is the linear speed of the vibration. Therefore, the motion in the drive mode is coupled into the orthogonal sense mode. In practical devices, due to imperfection of fabrication, the two modes may not be perfectly orthogonal and this non-orthogonal condition causes the power in the drive mode leaking into the sense mode in absence of the rotation of the gyroscope and thus can lead to a false detection of the rotation. This error is detrimental to gyroscopes. Therefore, it is desired to use degenerate modes by tuning the two modes to be truly orthogonal. For the mode-matched gyro, the displacement and oscillation velocity in the drive mode can be expressed as $$D_d = A_d \cos(\omega_0 t)$$

$$V_d = \omega_0 A_d \cos(\omega_0 t)$$

Therefore, the displacement caused by the Coriolis acceleration in the sense mode can be expressed as, $$D_{Coriolis}^{Sense} = 2\Omega \omega_0 A_d \cos(\omega_0 t) \frac{m_{eff} Q}{k} = \frac{2\Omega D_d Q}{\omega_0}$$

Therefore, a large Q in the sense mode can increase the sensitivity of the gyro. On the other hand, the minimum detectable rotation rate is fundamentally limited by the thermal noise in the sense mode. The average displacement of the sense mode caused by the thermal bath is, $$\sqrt{\langle D_{Thermal}^{Sense} \rangle^2} = \sqrt{\frac{4 k_B T}{m_{eff} \omega_0^2}}$$

The resolution of the gyro can be written as, $$\Omega_{min} = \frac{1}{A_d Q} \sqrt{\frac{k_B T}{m_{eff}}}$$

Therefore, a high Q mode-matched sense mode offers better resolution and sensitivity. However, it suffers from narrow bandwidth.

In other gyroscope implementations, an electrostatic feedback in the sensing mode was suggested to broaden the bandwidth. This feedback, however, can add extraneous noise and increases the device complexity. In the design in FIG. 1, the laser cooling of the sensing optical resonator 110 can be used to avoid such problem in an elegant form. The mechanical mode in presence of the Coriolis effect can be expressed as $$\frac{d^2 x}{dt^2} + \frac{\Omega_m}{2Q_m} \frac{dx}{dt} + \Omega_m^2 x = \frac{F_{langevin}(t)}{m_{eff}} + \frac{F_{Coriolis}(t)}{m_{eff}}$$

Assuming bandwidth of the Coriolis force is small comparing to the mechanical resonator linewidth, the signal to noise ratio can be derived as, $$SNR = \frac{S_{Coriolis}(\omega)}{S_{Langevin}(\omega)}$$

When the same resonator is applied with laser cooling, and when the laser is quantum-noise limited (which can be achieved in, e.g., Ti-sapphire lasers), the equation of motion becomes $$\frac{d^2 x}{dt^2} + \left( \frac{\Omega_m}{2Q_m} + \frac{\Gamma \xi}{cm_{eff}} \right) \frac{dx}{dt} + \left( \Omega_m^2 - \frac{\alpha \xi}{cm_{eff}} \right) x = \frac{F_{langevin}(t)}{m_{eff}} + \frac{F_{Coriolis}(t)}{m_{eff}}$$

As the equation of motion bears the same form before and after cooling, it can be derived that the signal to noise ratio remain unchanged after applying laser cooling.

$$SNR_{Cooling} = \frac{S_{Coriolis}(\omega)}{S_{Langevin}(\omega)}$$

In many practical device implementations, it can be desirable to integrate the system on a single chip which entails the use of semiconductor laser sources. This integration can add extra noise to the system. However, the deterioration of noise floor is negligible. The effective temperature increment caused by laser noise can be written as, $$T_{laser} = \frac{S_{Noise} P^2 Q_m}{2 k_B m_{eff} \Omega_m^3 R^2}$$

and the effective temperature of the mechanical resonator after cooling is $$T_{eff} = \frac{\Gamma}{\Gamma_{Cool}} (T + T_{laser})$$

Using the data where laser diode was used as pump light source, the original noise floor is only increased by a negligible 0.03 dB due to pump laser noise with even 1 mW pump power. Therefore, laser cooling can be applied to solve the problems of using high Q mode-matched sense mode nearly without adding extraneous noise as oppose to electrostatic feedback. Moreover, the radiation pressure induced stiffing effect can be utilized to fine-tune the mode resonance.

Figure 3:
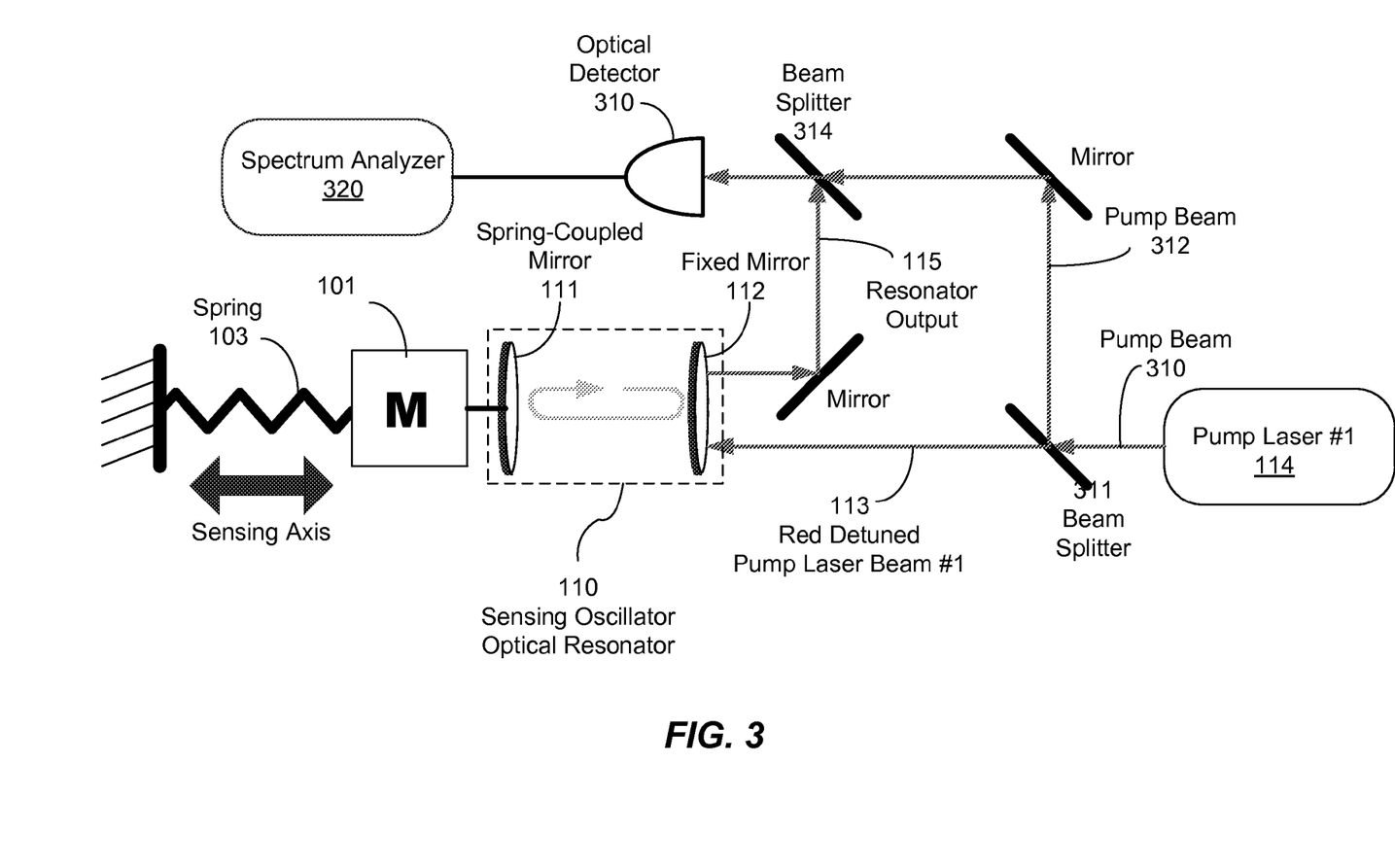
FIG. 3 shows an example of a homodyne detection design for sensing the sense mode motion in FIG. 1.

FIG. 3 shows an example of a homodyne detection design for sensing the sense mode motion in FIG. 1. The laser light produced by the laser 114 for pumping the sensing optical resonator 110 is split by a beam splitter 311 into two laser beams: the laser pump beam 113 to the sensing optical resonator 110 and another laser beam 312. The resonator output 115 and the laser beam 312 are directed to be combined at a beam splitter 314. The combined beam is then directed into an optical detector 310 which is coupled to a spectrum analyzer 320. As the mechanical motion of the sense mode also modulates the cooling laser, the motion of the sense mode can be detected using homodyne detection in FIG. 3. For quantum-noise-limited homodyne detection the displacement sensitivity is given by $$x_{min} = \frac{\lambda}{8\pi F \sqrt{\eta P/\hbar\omega}}$$

The displacement sensitivity is $5\times 10^{-19}$ m/$\sqrt{\text{Hz}}$.

Figure 4:
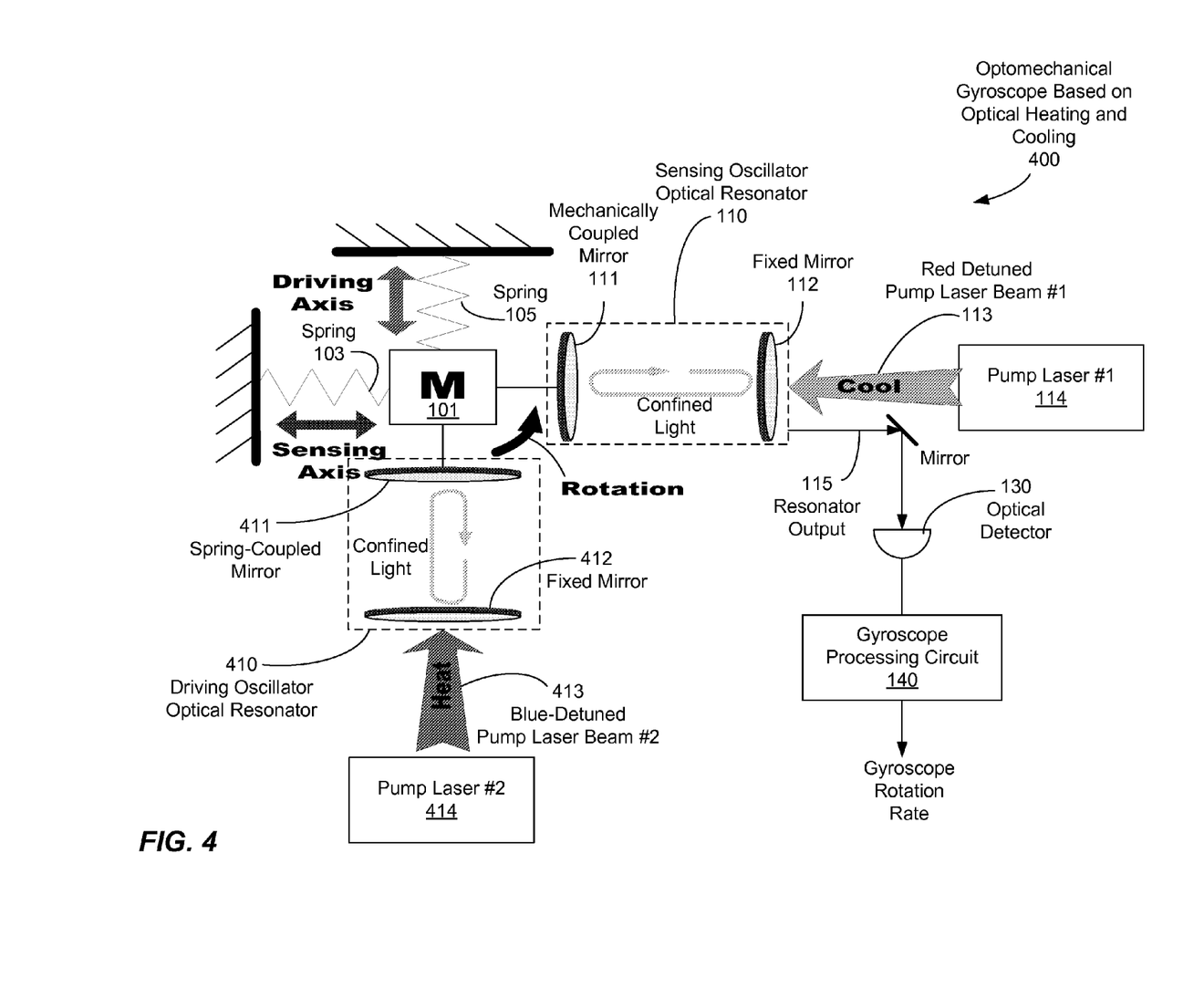
FIG. 4 shows another example of a gyroscope based on the optomechanical sensing in FIG. 1 where the drive 120 is implemented by another optomechanical drive based on optomechanical driving.

FIG. 4 shows another example of a gyroscope based on the optomechanical sensing in FIG. 1 where the drive 120 is implemented by another optomechanical drive based on optomechanical driving. In this example, the drive 120 for the driving oscillator in FIG. 1 is implemented by a spring-loaded mechanical oscillator coupled to the vibrating mass 101 to cause the vibrating mass 101 to oscillate along the driving axis and a driving optical resonator 410 coupled to the vibrating mass 101. The driving optical resonator 410 can be in various optical resonator configurations and the example shown in FIG. 1 is a Fabry-Perot resonator with mirrors 411 and 412. The mirror 411 is mechanically coupled to the vibrating mass 101 and moves with the vibrating mass 101. The resonator 410 is operated to receive a pump laser beam 413 at a pump laser frequency from another pump laser 414. The laser 414 is detuned from and is higher than the optical resonance of the driving optical resonator 410 to cause a transfer of energy from the driving optical resonator 410 to the spring-loaded mechanical oscillator to drive the vibrating mass 101 to oscillate along the driving axis. The two lasers 114 and 414 are controlled to be free of crosstalk between two lasers. Alternatively, in some implementations, the same laser 114 used for pumping the sensing optical resonator 110 may be used to pump the driving optical resonator 410 where the driving optical resonator 410 is set to an optical resonance that is detuned from and is lower than the laser frequency of the laser 114 to achieve desired optomechanical driving of the vibrating mass 101 along the driving axis. The vibrating mass 101 can be effectuated by using an object that is separate from the sensing and driving optical resonators 110 and 410 in some implementations and can also be designed as part of the sensing optical resonator 110 and/or driving optical resonator 410 in other implementations.

More specifically, the driving optical resonator 410 is operated under a different laser dynamic-back-action to heat the drive mode. Hence, the driving optical resonator 410 and the sensing optical resonator 110 are operated under two different laser dynamic back action conditions as shown in FIG. 5.

The heating in the driving optical resonator 410 reduces the system complexity of using other driving mechanism. This heating occurs if the pump power to the driving optical resonator 410 is above a threshold level defined as $$P_{Thresh} = \frac{\Omega_m^2}{\Omega_m} \frac{m_{eff} c^2}{\omega_0 \mathcal{F}^2 8n^2 C} \cdot \left( \frac{1}{4(\Delta - \Omega_m)^2 \tau^2 + 1} - \frac{1}{4(\Delta + \Omega_m)^2 \tau^2 + 1} \right)^{-1}$$

In the gyroscopes shown in FIGS. 1 and 4, each optical resonator (110 or 410) is set to a desired frequency detuning condition relative to the respective laser frequency of the pump light for laser cooling or laser heating. In practical implementations, a resonator detuning control can be provided to control the detuning condition between the optical resonator and the respective laser. Such detuning control is desirable to maintain the proper detuning condition against any drift or perturbation present in the gyroscope, such as temperature fluctuations and other factors.

Figure 5:
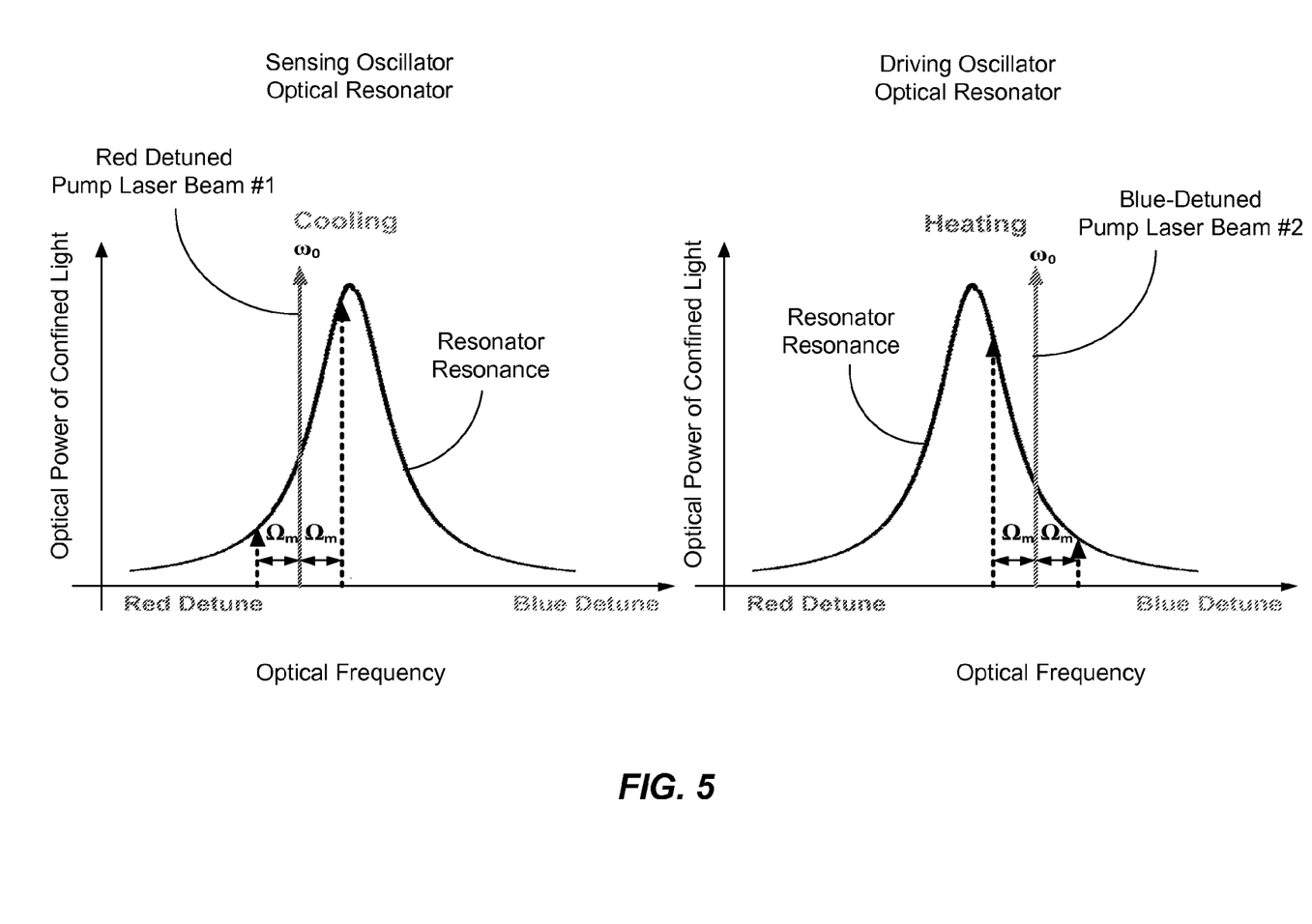
FIG. 5 shows the detuning conditions of the sensing and driving optical resonators in FIG. 4, respectively.
Figure 6:
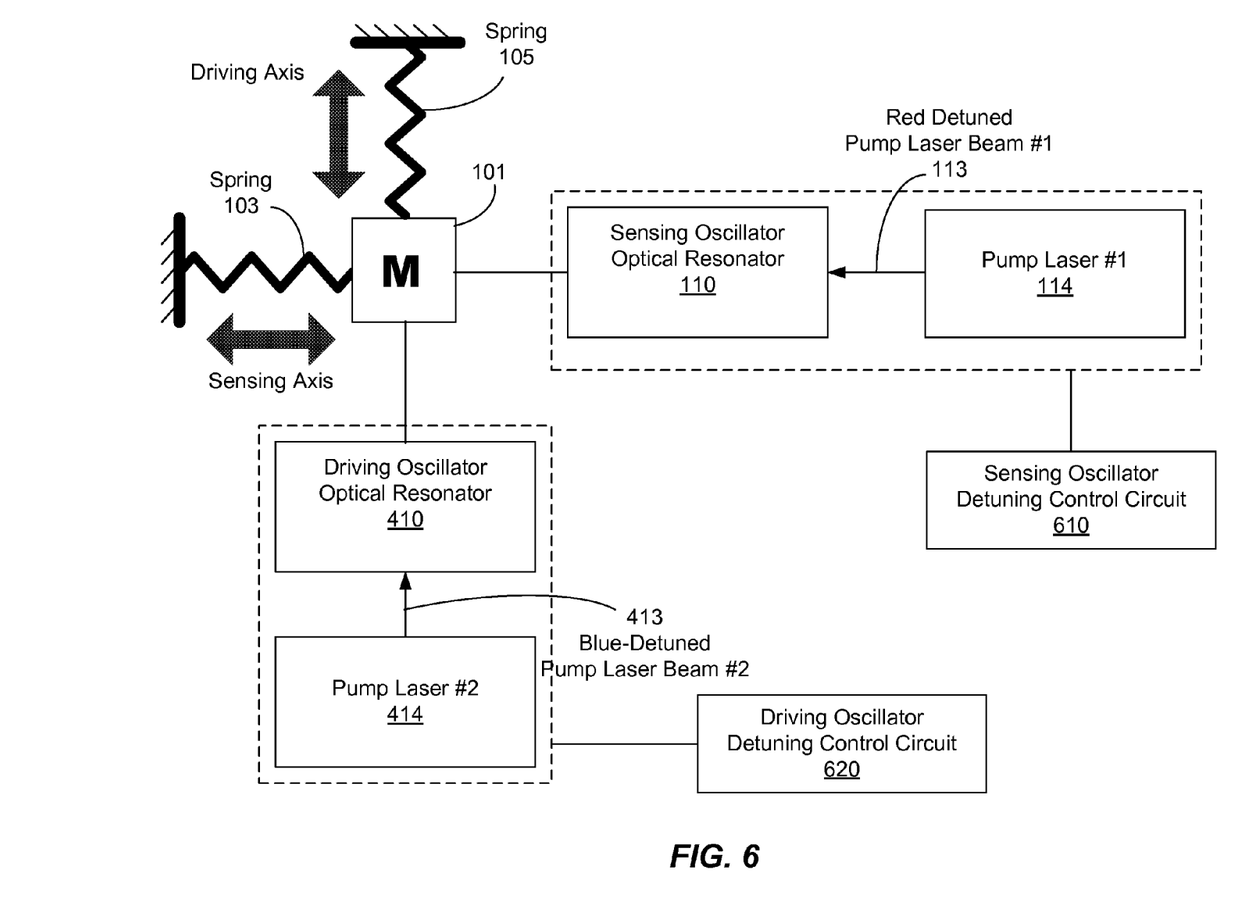
FIG. 6 shows an example for implementing the detuning control in the gyroscope in FIG. 5 where two separate lasers are used to pump the sensing and driving optical resonators, respectively.

FIG. 6 shows an example for implementing the detuning control in the gyroscope 400 in FIG. 5 where two separate lasers 114 and 414 are used to pump the sensing and driving optical resonators 110 and 410, respectively. A sensing oscillator detuning control circuit 610 is provided to control either or both of the sensing optical resonator 110 and the laser 114 to achieve the desired detuning for laser cooling. Similarly, a driving oscillator detuning control circuit 620 is provided to control either or both of the driving optical resonator 410 and the laser 414 to achieve the desired detuning for laser heating.

As mentioned above, the sensing and driving optical resonators 110 and 410 in FIG. 4 can be implemented in various resonator configurations other than the Fabry-Perot resonator examples shown in FIG. 4. Exemplary optical resonator configurations include planar disk resonators, ring resonators, spring-mass resonators and spherical resonator.

Figure 7:
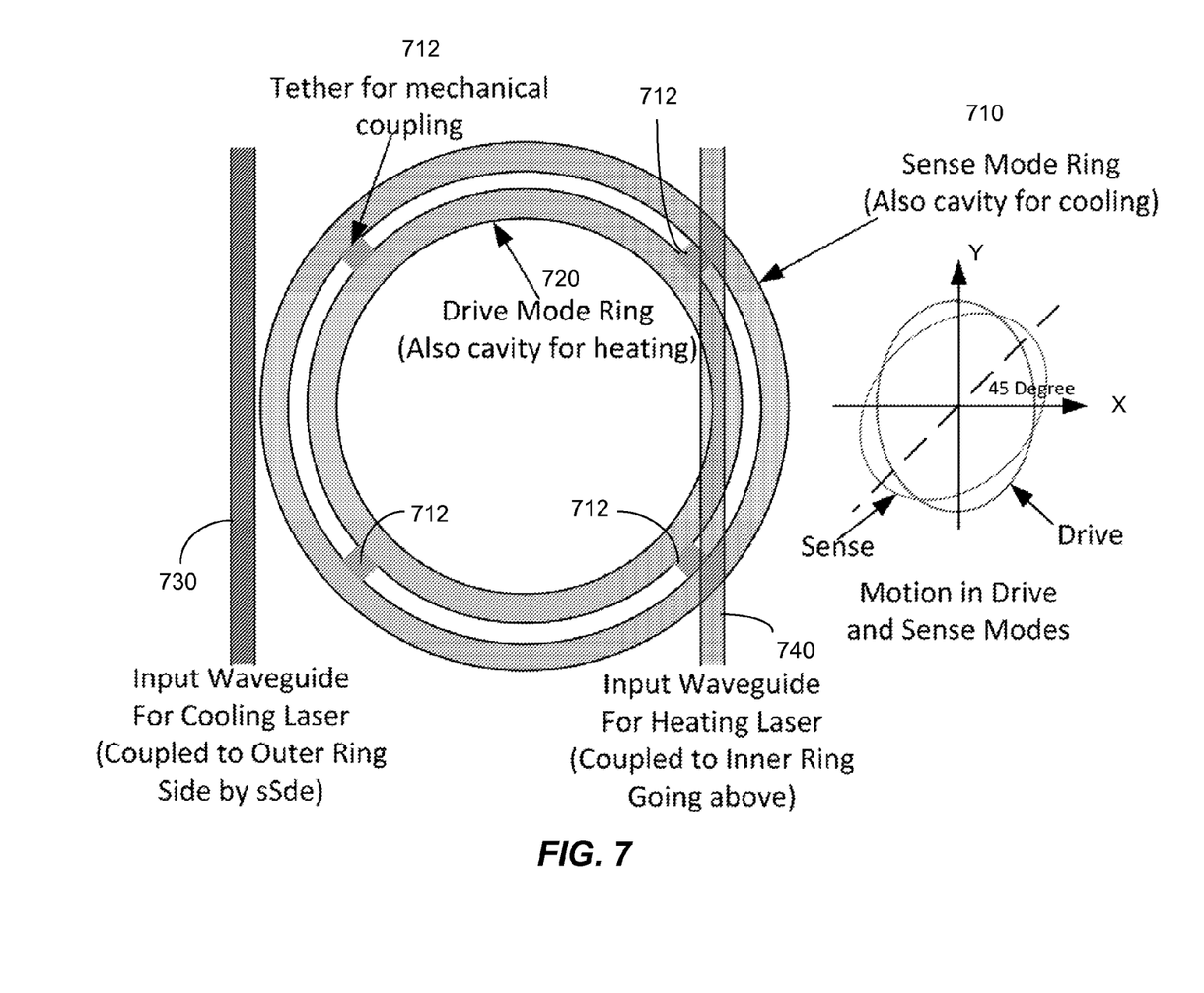
FIG. 7 shows an example of using two coupled optical ring resonators to implement the sensing and driving optical resonators in FIG. 4, respectively.

FIG. 7 shows an example where the sensing and driving optical resonators 110 and 410 are two mechanically coupled ring resonators 710 and 720. In this example, the sensing ring resonator 710 is a larger ring placed outside the smaller driving ring resonator 710. The two rings 710 and 720 are mechanically engaged to each other via connectors or tethers 712. A first optical waveguide 730 is placed next to the ring 710 to couple pump light into the ring 710 via, e.g., optical evanescent coupling. In the example shown, the waveguide 730 is placed side by side with the ring 710. Alternatively, the waveguide 730 can be placed above the ring 730 to provide the proper optical coupling. A second waveguide 740 is placed above the ring 720 to couple pump light into the ring 720 via, e.g., optical evanescent coupling. The two rings 710 and 720 are mechanically driven at two different mechanical modes as shown by the insert where the driving ring 720 is mechanically structured to mechanically oscillate in one mode along the y direction while sensing ring 710 mechanically oscillates in a different mode along a 45-degree axis. The connectors or tethers 712 are designed to allow the two rings 710 and 720 to operate in different mechanical modes such as the example shown in FIG. 7.

In FIG. 7, each of the two rings 710 and 720 is both a mechanical oscillator where the ring itself is a vibrating mass and an optical resonator. The two rings 710 and 720 are mechanically coupled (without optical coupling) via the connectors or tethers 712 to allow transfer of mechanical energy from the driving ring 720 operated under the laser heating condition to the sensing ring 710 operated under the laser cooling condition. Therefore, there is no need to engage a separate object as a separate vibrating mass to the two rings 710 and 720.

The above described optomechanical techniques and gyroscope design in FIG. 4 attach harness the anti-viscous radiation force to drive the mechanical mode into self-oscillation. Because the optomechanical self-oscillation is a self-sustaining process with no feedback loop involved, there is no flicker component added into the drive mode phase noise which can help in long term stability of the drive oscillator. By attaching the sense mode of a mode-matched high-Q rate gyro to the sensing optical resonator, the radiation pressure can be harnessed to increase the bandwidth and dynamic range of the sense mode without deteriorating the noise performance. Therefore, the design in FIG. 4 can simultaneously achieve high sensitivity, high resolution offered by the high Q sense mode, while maintain large bandwidth and high dynamic range. The proposed scheme is inherently compatible with optical interferometry measurement which can enable atto-meter level displacement detection in the sense mode.

The above described optomechanical techniques for gyroscopes can be applied to various mechanical resonators within vibratory gyroscopes to release the bandwidth and sensitivity constraint of the resonator, meanwhile providing driving force for the different driving mode resonator.

As discussed above, in some configurations, a gyroscope includes a vibrating mass and a driving oscillator coupled to the vibrating mass. The driving oscillator is to drive the vibrating mass to oscillate along a driving axis. A sensing oscillator is coupled to the vibrating mass to allow the vibrating mass to oscillate along a sensing axis that is different from the driving axis. The sensing and driving oscillators are in mechanically different modes (e.g., mechanically or mathematically orthogonal modes). Mechanical orthogonality may be achieved by configuring the two axes to be perpendicular to each other. Mechanical orthogonality may also be achieved by having the two axes at a different angle (e.g., 45 degrees) such that the vibration modes are orthogonal to each other. The sensing oscillator includes (1) a sensing mechanical oscillator coupled to the vibrating mass to detect oscillations of the vibrating along the sensing axis and (2) a sensing optical resonator coupled to the vibrating mass to respond to an oscillation of the vibrating mass to modulate an optical resonance of the sensing optical resonator and to detector the oscillation. The gyroscope further includes a laser that produces laser light at a laser frequency that is detuned from and is less than the optical resonance of the sensing optical resonator to cause a transfer of energy from the sensing mechanical oscillator to the sensing optical resonator and a sensing mechanism that measures modulated light in the sensing optical resonator indicating a motion of the vibrating mass along the sensing axis to obtain rotation information of the gyroscope based on coupling between the sensing oscillator and the driving oscillator caused by rotation of the gyroscope.

In some implementations, the sensing optical resonator is an optical Fabray-Perot resonator that is formed with two mirrors. One of the two mirrors is coupled to, and moves with, the vibrating mass to change the optical resonance of the optical Fabry-Perot resonator as the coupled mirror moves with the vibrating mass. In some implementations, the sensing optical resonator may be an optical Fabray-Perot resonator that uses a ring or disc type resonator that uses a guided light cavity. In some implementations, the sensing optical resonator may include a 1D photonic cavity. The cavities of the ring, disc or the 1D resonator may be filled with a dielectric material (other than air or free space).

Figure 8:
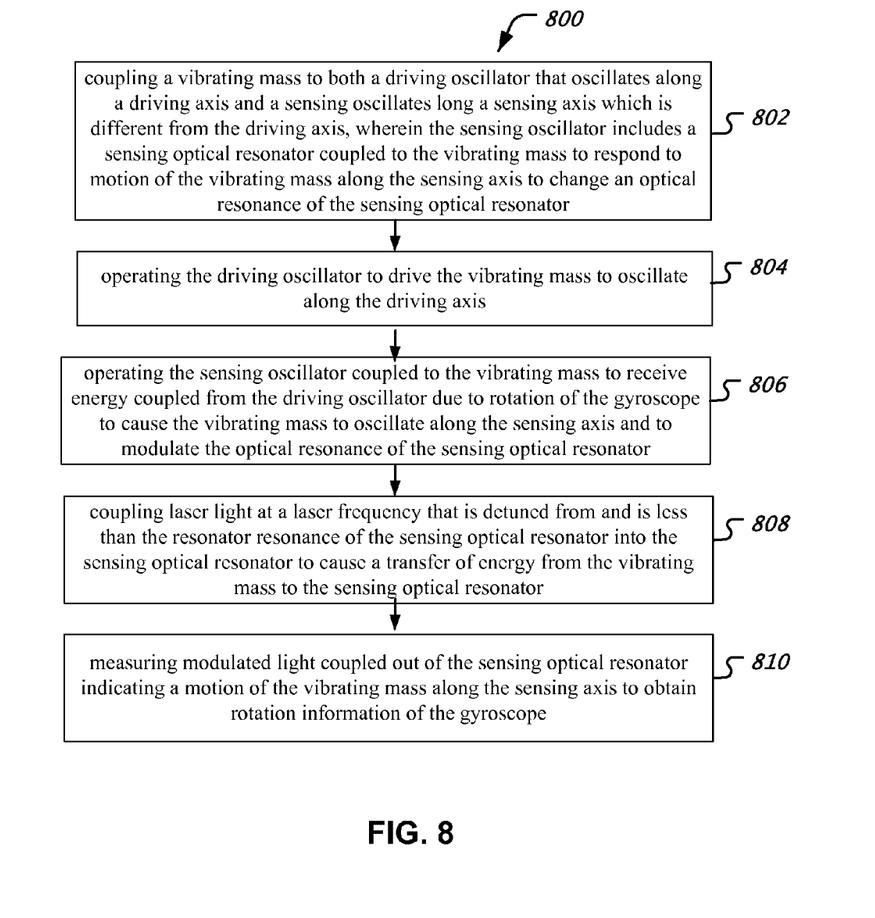
FIG. 8 is a flowchart representation of a process of using a gyroscope to measure a rotation based on optomechanical sensing.

FIG. 8 is a flowchart representation of a process 800 of operating gyroscope to measure a rotation. At 802, a vibrating mass is coupled to both a driving oscillator that oscillates along a driving axis and a sensing oscillates long a sensing axis which is different from the driving axis, wherein the sensing oscillator includes a sensing optical resonator coupled to the vibrating mass to respond to motion of the vibrating mass along the sensing axis to change a resonator resonance of the sensing optical resonator. At 804, the driving oscillator is operated to drive the vibrating mass to oscillate along the driving axis. At 806, the sensing oscillator coupled to the vibrating mass is operated to receive energy coupled from the driving oscillator due to rotation of the gyroscope to cause the vibrating mass to oscillate along the sensing axis and to modulate the resonator resonance of the sensing optical resonator. At 808, laser light at a laser frequency that is detuned from and is less than the resonator resonance of the sensing optical resonator into the sensing optical resonator is coupled to cause a transfer of energy from the vibrating mass to the sensing optical resonator. At 810, modulated light coupled out of the sensing optical resonator indicating a motion of the vibrating mass along the sensing axis is measured to obtain rotation information of the gyroscope.

In some implementations, the sensing optical resonator is an optical Fabry-Perot resonator formed of two mirrors. One of the two mirrors is coupled to, and moves with the vibrating mass to change the optical resonance of the optical Fabry-Perot resonator as the coupled mirror moves with the vibrating mass. In some implementations, a guided light Fabry-Perot resonator, such as disk, ring or 1-D defect cavity type photonics resonators may be used. In some configurations, the sensing mechanical oscillator of the sensing oscillator includes a spring loaded mechanical oscillator. In some configurations, process 800 further includes operating an electrostatic drive in the driving oscillator to drive the vibrating to oscillate along the driving axis.

In some configurations, process 800 further includes operating an optical resonator in the driving oscillator to transfer optical energy in the optical resonator to the vibrating mass to drive the vibrating mass oscillate along the driving axis. The driving oscillator includes a spring-loaded mechanical oscillator coupled to the vibrating mass to cause the vibrating mass to oscillate along the driving axis. The optical resonator in the driving oscillator is operable to receive a pump laser beam at a pump laser frequency that is detuned from and is higher than a resonator resonance of the optical resonator to cause the transfer of the optical energy to the spring-loaded mechanical oscillator.

In some configurations, process 800 further includes operating a laser to produce the laser light at the laser frequency that is coupled into the sensing optical resonator and directing a portion of the laser light from the laser and the modulated light output by the sensing optical resonator into an optical detector to effectuate a homodyne detection indicates a motion of the vibrating mass.

It will be appreciated that various techniques have been disclosed for operating a gyroscope to measure a rotation. In the disclosed embodiments, two different lasers may be used: a drive laser for optomechanically driving an oscillator and a sensing laser for the sensing mechanism. It will further be appreciated that these two laser can be distinct from each other, configured to eliminate any cross-talk between the two lasers. It will further be appreciated that while certain embodiments are discussed as micro scale implementations, mesoscale implementations of the disclosed techniques are also possible.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A gyroscope, comprising:
a vibrating mass;
a driving oscillator coupled to the vibrating mass to drive the vibrating mass to oscillate along a driving axis;
a sensing oscillator coupled to the vibrating mass to allow the vibrating mass to oscillate along a sensing axis that is different from the driving axis, the sensing oscillator including (1) a sensing mechanical oscillator coupled to the vibrating mass to cause the vibrating mass to oscillate along the sensing axis and (2) a sensing optical resonator coupled to the vibrating mass to respond to an oscillation of the vibrating mass to modulate an optical resonance of the sensing optical resonator;
a laser that produces a laser light beam at a laser frequency that is detuned from and is less than the optical resonance of the sensing optical resonator to cause a transfer of energy from the sensing mechanical oscillator to the sensing optical resonator; and
a sensing mechanism that measures modulated light in the sensing optical resonator indicating a motion of the vibrating mass along the sensing axis to obtain rotation information of the gyroscope based on coupling between the sensing oscillator and the driving oscillator caused by rotation of the gyroscope.

2. The gyroscope as in claim 1, wherein:
the sensing optical resonator is an optical Fabry-Perot resonator formed of two mirrors and one of the two mirrors is coupled to, and moves with, the vibrating mass to change the optical resonance of the optical Fabry-Perot resonator as the coupled mirror moves with the vibrating mass.

3. The gyroscope as in claim 1, wherein:
the sensing mechanical oscillator of the sensing oscillator includes a spring loaded mechanical oscillator.

4. The gyroscope as in claim 1, wherein:
the driving oscillator includes a spring-loaded mechanical oscillator and an electrostatic drive that drives the spring-loaded mechanical oscillator to oscillate along the driving axis.

5. The gyroscope as in claim 1, wherein:
the driving oscillator includes:
a spring-loaded mechanical oscillator coupled to the vibrating mass to cause the vibrating mass to oscillate along the driving axis; and
a driving optical resonator coupled to the vibrating mass and operable to receive a pump laser beam from the laser at the laser frequency, wherein the driving optical resonator is set to an optical resonance that is detuned from and is lower than the laser frequency to cause a transfer of energy from the driving optical resonator to the spring-loaded mechanical oscillator to drive the vibrating mass to oscillate along the driving axis.

6. The gyroscope as in claim 1, wherein:
the driving oscillator includes:
a spring-loaded mechanical oscillator coupled to the vibrating mass to cause the vibrating mass to oscillate along the driving axis; and
a driving optical resonator coupled to the vibrating mass and operable to receive a pump laser light beam at a pump laser frequency that is detuned from and is higher than an optical resonance of the driving optical resonator to cause a transfer of energy from the driving optical resonator to the spring-loaded mechanical oscillator to drive the vibrating mass to oscillate along the driving axis.

7. The gyroscope as in claim 6, comprising:
a pump laser that produces the pump laser light beam.

8. The gyroscope as in claim 1, wherein:
the sensing mechanism includes an optical detector that is located to receive the modulated light output by the sensing optical resonator.

9. The gyroscope as in claim 1, wherein:
the sensing mechanism includes:
an optical detector that is located to receive both the modulated light output by the sensing optical resonator and a portion of the laser light beam from the laser at the laser frequency to effectuate a homodyne detection indicates a motion of the vibrating mass.

10. The gyroscope as in claim 1, wherein:
the sensing optical resonator includes an optical ring resonator.

11. The gyroscope as in claim 1, wherein:
the sensing optical resonator of the sensing oscillator includes a sensing optical ring resonator;
the driving oscillator includes a driving optical ring resonator coupled to the vibrating mass and operable to receive a pump laser beam at a pump laser frequency that is detuned from and is higher than an optical resonance of the driving optical ring resonator to cause a transfer of energy from the driving optical ring resonator to the vibrating mass to oscillate along the driving axis.

12. The gyroscope as in claim 11, wherein:
the driving optical ring resonator and the sensing optical ring resonator are mechanically coupled to each other.

13. The gyroscope as in claim 1, wherein:
the vibrating mass, the driving oscillator, the sensing oscillator including the sensing optical resonator, the laser and the sensing mechanism are configured as a MEMS.

14. A method for operating a gyroscope to measure a rotation, comprising:
coupling a vibrating mass to both a driving oscillator that oscillates along a driving axis and a sensing oscillator that oscillates along a sensing axis which is different from the driving axis, wherein the sensing oscillator includes a sensing optical resonator coupled to the vibrating mass to respond to motion of the vibrating mass along the sensing axis to change an optical resonance of the sensing optical resonator;
operating the driving oscillator to drive the vibrating mass to oscillate along the driving axis;
operating the sensing oscillator coupled to the vibrating mass to receive energy coupled from the driving oscillator due to rotation of the gyroscope to cause the vibrating mass to oscillate along the sensing axis and to modulate the optical resonance of the sensing optical resonator;
coupling a laser light beam at a laser frequency that is detuned from and is less than the optical resonance of the sensing optical resonator into the sensing optical resonator to cause a transfer of energy from the vibrating mass to the sensing optical resonator; and measuring a modulated light beam coupled out of the sensing optical resonator indicating a motion of the vibrating mass along the sensing axis to obtain rotation information of the gyroscope.

15. The method as in claim 14, wherein:

the sensing optical resonator is an optical Fabry-Perot resonator formed of two mirrors and one of the two mirrors is coupled to, and moves with, the vibrating mass to change the optical resonance of the optical Fabry-Perot resonator as the coupled mirror moves with the vibrating mass.

16. The method as in claim 14, wherein:

the sensing oscillator includes a sensing mechanical oscillator coupled to the vibrating mass to cause the vibrating mass to oscillate along the sensing axis, and the sensing mechanical oscillator of the sensing oscillator includes a spring loaded mechanical oscillator.

17. The method as in claim 14, comprising:

operating an electrostatic driver as part of the driving oscillator to drive the vibrating mass to oscillate along the driving axis.

18. The method as in claim 14, comprising:

operating an optical resonator in the driving oscillator to transfer optical energy in the optical resonator to the vibrating mass to drive the vibrating mass to oscillate along the driving axis.

19. The method as in claim 18, wherein:

the driving oscillator includes a spring-loaded mechanical oscillator coupled to the vibrating mass to cause the vibrating mass to oscillate along the driving axis; and the optical resonator in the driving oscillator is operable to receive a pump laser beam at a pump laser frequency that is detuned from and is higher than an optical resonance of the optical resonator to cause the transfer of the optical energy to the spring-loaded mechanical oscillator.

20. The method as in claim 14, comprising:

operating a laser to produce the laser light beam at the laser frequency that is coupled into the sensing optical resonator; and directing a portion of the laser light beam from the laser and the modulated light beam output by the sensing optical resonator into an optical detector to effectuate a homodyne detection indicates a motion of the vibrating mass.

* * * * *